Nov. 15, 1955     S. E. JEPSON     2,723,483
FISHING LURE
Filed March 2, 1950
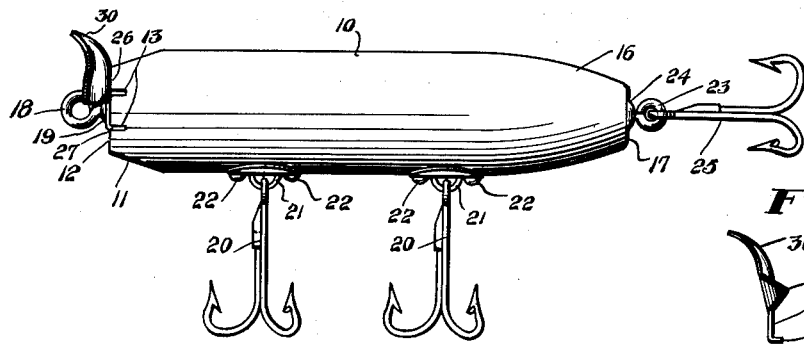
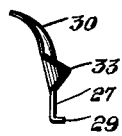
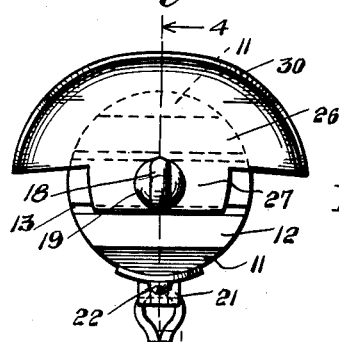
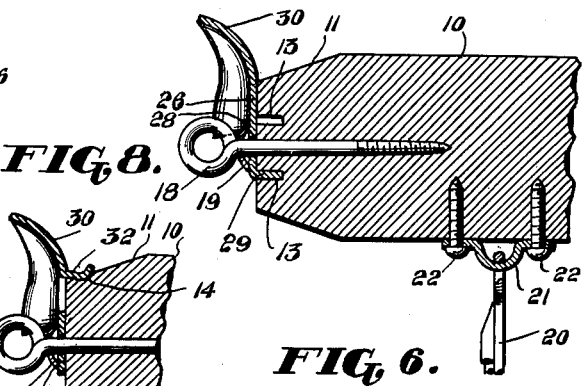
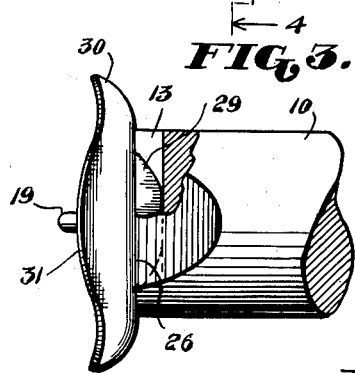
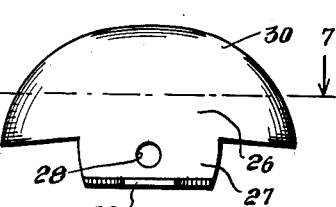
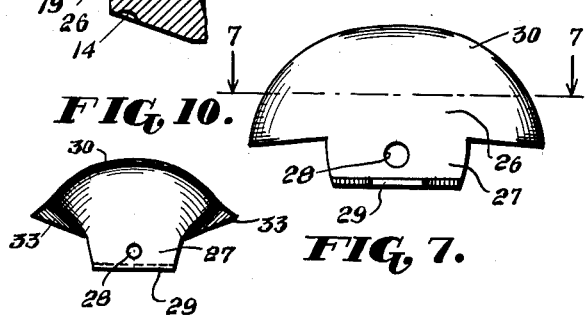
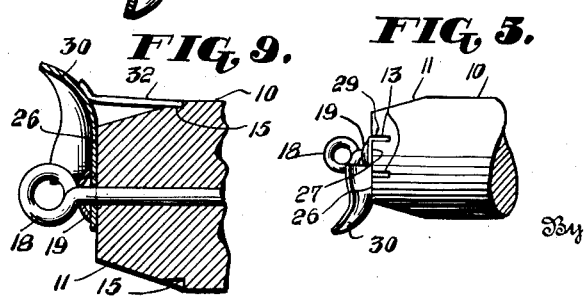
Inventor
Simon E. Jepson
By John W. Smith
Agent

United States Patent Office 2,723,483
Patented Nov. 15, 1955

2,723,483

FISHING LURE

Simon E. Jepson, Dassel, Minn.

Application March 2, 1950, Serial No. 147,271

4 Claims. (Cl. 43—42.22)

This invention relates to an artificial fishing lure of the plug type and in particular to the type of lure commonly known as a "surface lure."

It is an object of the present invention to provide a fishing lure that will skim the surface when drawn through the water.

It is another object of the present invention to provide a fishing lure which, when trolled along the surface of the water, will make a noise that will attract the fish.

It is an additional object of the present invention to provide a fishing lure with a reversible nose flange, which in one position will keep the lure on the surface and in another position will cause the lure to travel under the surface of the water.

It is a further object of the present invention to provide a fishing lure having a body of distinctive shape to facilitate travel of the lure through the water.

Still other objects, advantages and improvements will be apparent from the following description, taken in connection with the accompanying drawings, in which:

Figure 1 is a side elevation view of the fishing lure according to the present invention;

Figure 2 is a front end elevation view of same;

Figure 3 is a partial top plan view, with part of the body broken away, to show the flange mounting;

Figure 4 is a partial sectional view showing the flange in upright position;

Figure 5 is a partial side elevation view showing the flange in downturned position;

Figure 6 is a rear elevation view of the flange in upright position;

Figure 7 is a sectional view of the flange taken on the section line 7—7 of Figure 6;

Figure 8 is a partial sectional view showing a modification of the flange mounted in upright position;

Figure 9 is also a partial sectional view showing another modification of the flange in upright position;

Figure 10 is a front elevation view showing still another modification of the flange; and, Figure 11 is a side elevation view showing the modification of the flange according to Figure 10.

Referring now to the drawings in detail, and to Figure 1 in particular, the fishing lure according to the present invention is here shown as having a cylindrical body 10, a frusto-conical nose 11 terminating in a blunt front 12, and a truncated bullet shaped trailing section 16 terminating in a plane rear end 17. The blunt front 12 is the mounting surface for the flange, to be later described. The trailing rear section 16 extends for a length of less than a quarter of the over all length of the lure. A pulling eye 18, to which the line (not shown) is attached is mounted in the blunt front end 12, a cup shaped washer 19 being positioned thereunder. On the under side of the cylindrical body 10 hooks 20—20 are mounted by eye straps 21 secured to the body by screws 22. Similarly, on the rear end 17 hooks 25 are mounted by a screw eye 23 having a cup shaped washer 24 thereunder.

The flange according to the present invention is fully shown in Figures 2 and 6. This flange has a flat portion 26 formed as a segment of a circle and having a central extension 27, the latter having a hole 28 therein through which the screw eye 18 passes, and terminates in a lug or toe 29. Surrounding the portion 26 of the flange there is a rim 30 which is curved upwardly and outwardly, as shown in Figures 4 and 8. The radius of curvature of this flange decreases gradually from the line of contact with the blunt front end 12 of the plug. As shown in Figure 3, the rim 30 is slightly flattened on top to provide a wavy edge 31.

The flange is shown in upright position in Figures 1, 2, and 4 and in downturned position in Figure 4. In both positions the bottom 26 of the flange rests flat against the blunt front end 12 of the body of the lure and the screw eye 18 passes through the hole 28 in the bottom to secure the flange in place. In the upright position the toe 29 of the flange is positioned in a lower chordal slot 13 in the blunt front end 12 of the body; in the downturned position the toe is positioned in an upper chordal slot 13.

With the flange in the upright position, the lure will ride over the surface of the water and with consecutive jerks on the line, because of the curvature of the flange 30, the lure will make a plunking noise which has been found to be attractive to the fish.

With the flange in the downturned position, it will cause the lure to travel below the surface. The curvature of the flange is determined so that the lure will travel a foot to a foot and a half below the surface, the exact depth being under control of the line. This has the outstanding advantage that the lure can be maneuvered over weeds growing in deep water.

In the modification of the flange according to Figure 8, the bottom of the flange has an outstruck lug 32 which is adapted to seat in either of two indentations 14—14 in the upper and lower surfaces of the frusto-conical nose 11 of the lure. This feature provides for more secure attachment of the flange to the body of the lure.

In another modification of the flange according to Figure 9, the rim 30 of the flange has a brace 32 secured at one end thereto, the other end of this brace being adapted to seat in either of two notches 15—15 in the upper and lower surfaces of the frusto-conical nose 11 of the lure. This construction minimizes deflection of the rim of the flange with respect to the body of the lure.

In a further modification of the flange according to Figures 10–11, there are two circumferentially positioned bent back tips or wings 33—33 on opposite sides of the center line of the rim of the flange. These wings keep the lure riding even on the surface of the water.

While I have illustrated and described herein the preferred embodiment of my invention, it is to be understood that various changes in the sizes, shapes, and relative arrangement of the different parts may be made without departing from the spirit of the invention as defined in the following claims.

What I claim as new and useful and desire to secure by Letters Patent of the United States is:

1. In a fishing lure, a body having a blunt nose with a pair of horizontally disposed chordal slots therein respectively positioned on opposite sides of the longitudinal axis of the body, and a flange having an upwardly and outwardly curved rim and a chordally disposed toe, said toe being adapted to be inserted in either of said slots to position the flange on the nose in either of two positions relatively displaced 180 degrees, and means securing the flange on the nose.

2. In a fishing lure, a body having a blunt nose with a pair of horizontally disposed chordal slots therein respectively positioned on opposite sides of the longitudinal axis of the body, a flange having a hole therein, an upwardly and outwardly curved rim, and a chordally disposed toe, said toe being adapted to be inserted in either of said slots to position the flange on the nose in either of two positions relatively displaced 180 degrees, and a pulling eye mounted centrally of the nose and extending through the hole in the flange for securing the flange on the nose.

3. In a fishing lure, a body having a blunt nose provided with a pair of horizontally disposed chordal slots therein respectively positioned on opposite sides of the longitudinal axis of the body, and a flange having a hole therein for receiving said pulling eye, an upwardly and outwardly curved rim, and terminating in a laterally projecting lug, said lug being adapted to seat in either of said chordal slots in the nose to position the flange onto the nose in either of two positions relatively displaced 180 degrees, and a pulling eye mounted centrally of the nose and engaging the flange for securing the flange on the nose.

4. In a fishing lure, a generally cylindrical body having a plane front end at right angles to the axis of the cylindrical body, a shiftable flange adapted to be secured to said plane front end in either of two positions 180 degrees displaced, said shiftable flange having a flat section formed as a segment of a circle of radius at least equal to that of the plane front end of the cylindrical body, a rim curved forwardly and outwardly from the flat segmental section throughout the entire curved periphery of the latter, and an extension formed on said segmental bottom section having its side edges substantially vertically disposed and being of lesser width than the diameter of the cylindrical body, and an eye having a shank extending through said extension securing the shiftable flange to the front end of the cylindrical body.

References Cited in the file of this patent

UNITED STATES PATENTS

| Number | Name | Date |
|---|---|---|
| 1,312,451 | Medley | Aug. 5, 1919 |
| 1,452,359 | Cass | Apr. 17, 1923 |
| 1,926,459 | Sisco | Sept. 12, 1933 |
| 2,134,330 | Fink | Oct. 25, 1938 |
| 2,382,595 | Wood | Aug. 14, 1945 |
| 2,482,466 | Cooper | Sept. 20, 1949 |
| 2,495,134 | Roberts | Jan. 17, 1950 |